United States Patent [19]

McCutcheon

[11] 3,992,880
[45] Nov. 23, 1976

[54] VARIABLE CAPACITY TORQUE CONVERTER AND METHOD

[75] Inventor: Andrew R. S. McCutcheon, Rancho Palos Verdes, Calif.

[73] Assignee: The Garrett Corporation, Los Angeles, Calif.

[22] Filed: Aug. 7, 1975

[21] Appl. No.: 602,852

[52] U.S. Cl. .................................. 60/327; 60/347; 60/352; 60/39.14
[51] Int. Cl.² ........................................ F16D 33/02
[58] Field of Search ............ 60/327, 347, 352, 361, 60/39.14, 329, 625; 123/179 F; 415/115

[56] References Cited
UNITED STATES PATENTS

| | | | |
|---|---|---|---|
| 2,874,894 | 2/1959 | Goldschmied | 415/116 X |
| 3,220,187 | 11/1965 | Perkins | 60/352 |
| 3,451,214 | 6/1969 | Bradley | 60/39.14 |

Primary Examiner—Edgar W. Geoghegan
Attorney, Agent, or Firm—James W. McFarland; Albert J. Miller

[57] ABSTRACT

A fixed geometry torque converter having variable power absorption capacity by provision of a secondary fluid flow path which introduces fluid at the trailing edge region of the stator vane adjacent the impeller and at a direction normal to the primary flow of fluid from the turbine passing across the stator to return to the impeller. The rate of this secondary fluid flow is selectively varied to alter the direction of the primary flow of fluid and thereby selectively vary the power absorption capacity of the torque converter. In combination with a fluid turbomachine as utilized in aircraft systems, the variable capacity torque converter is arranged in the power drive train so as to load the turbomachine. By selectively varying the power absorption capacity of the torque converter in relation to prevailing ambient conditions, a greater amount of the power output capacity of the turbine machine may be utilized at various ambient conditions without causing stalling of the turbine machine.

20 Claims, 6 Drawing Figures

VARIABLE CAPACITY TORQUE CONVERTER AND METHOD

The Invention herein described was made in the course of or under a contract with the Department of the Air Force.

BACKGROUND OF THE INVENTION

This invention relates to variable power absorption torque converters, and to the use of such torque converters in the drive train of a turbomachine such as incorporated in aircraft.

A fluid turbine machine is often utilized in aircraft either as the main propulsion engine, or as an auxiliary power unit supplying power for main engine starting, and/or power for driving the aircraft accessories. The output power of such a fluid turbine machine varies as a function of altitude, temperature, and other ambient conditions. It is many times desirable to provide a fluid coupling and torque multiplication device which is driven by the relatively constant speed, prime mover fluid turbine machine in order to match the desired variable speed and torque requirements. The fluid coupling therefore is disposed in the drive train so as to be the element which imposes the load upon the turbine machine.

The power absorption capacity (and therefore the load imposed upon the prime mover turbomachine) of a fixed geometry torque converter is determined by its size, geometry, input speed, and output speed. Therefore, the power absorption capacity of conventional fixed geometry torque converter does not vary as a function of ambient conditions as does the power output capacity of the turbomachine. The load imposed by the torque converter must not exceed the power output capacity of the turbomachine, to avoid turbine stalling. Therefore, it has been conventional practice to size the torque converter to match the minimum full output power the turbomachine produces at the least favorable ambient conditions expected to be encountered. Thus, the maximum power available from the turbomachine is usable only at this least favorable ambient condition point (called design point). At all other operating conditions, the turbomachine has additional power available which may not be absorbed and utilized by the undersized torque converter. Furthermore, a fixed geometry torque converter does not absorb constant power at all ratios of converter input and output speeds, thus further requiring torque converter undersizing at all but the most favorable speed ratio condition.

It is therefore apparent that it would be highly useful to provide a fluid coupling or torque converter in the drive train from a turbomachine operable in varying ambient conditions, wherein the torque converter has variable capacity features for obtaining maximum performance of the turbine machine at all ambient conditions. In addition to the parameters listed above which determine the power absorption capacity of a fixed geometry torque converter, variable geometry torque converters have a variable power absorption capacity which is additionally a function of mass flow rate in the torque converter as well as the directional properties of the mass flow fluid velocity. Parametric influences on power absorption capacity include the angles of the primary mass flow upon exiting the impeller, the turbine and the reactor or stator vanes, meridional flow area, impeller outlet radius, and the speed ratio of the torque converter.

One type of variable capacity torque converter utilizes variably positionable stator vanes which may be selectively pivoted relative to primary fluid flow in the torque converter to alter the direction of this primary flow when passing between the impeller and turbine of the torque converter. Change of direction of the primary flow alters the effective geometry of the converter and thus its power absorption capacity. Such previous attempts have concentrated on mechanical arrangements for individually pivoting each of the stator blades. This approach, particularly in smaller size turbine machines, has led to a high degree of mechanical complexity and attendant increase in manufacturing costs and decrease in unit reliability. Another approach has been to allow the entire set of stator vanes to rotate about the torque converter centralaxis. The torque converter capacity is varied dependent upon a direction and speed of rotation of the set of stator vanes. Again, this mechanical approach has the limitations of complexity, higher cost and lower reliability. Yet another approach, altering input speed to the torque converter is not feasible in many instances, such as a turbomachine, where it is desired that the prime mover operate at constant speed.

It is apparent, therefore, that it would be highly desirable to provide a variable capacity torque converter in which the capacity may be varied non-mechanically. Such arrangement would be particularly useful in conjuction with a turbomachine, such as the relatively small fluid turbine machine utilized as auxiliary power units for starting the main engines of an aircraft, wherein it is important that the maximum power available from the turbine machine be utilized and yet that the turbine machine never be subject to stalling.

SUMMARY OF THE INVENTION

It is therefore a primary object of the present invention to provide a torque converter method and apparatus wherein the power absorption capacity of the torque converter is varied non-mechanically.

Another important object of the present invention is to provide such a variable capacity torque converter method and apparatus for use with a fluid turbine machine operating in varying ambient conditions, wherein the power absorption capacity of the torque converter is selective non-mechanically varied in relation to the prevailing ambient conditions in order to avoid stalling of the fluid turbine machine while still utilizing maximum power that may be developed from the latter in various ambient conditions, the torque converter thereby capable of being sized to absorb the maximum power that may be developed by the turbomachine at most favorable, rather than least favorable ambient conditions.

More particularly, it is an object of the present invention to provide such a variable capacity torque converter wherein the power absorption capacity is varied by introduction into the primary flow of fluid in the torque converter, a secondary flow of fluid operable to change the direction of the primary flow, the rate of this secondary flow being variable in order to alter the power absorption capacity of the converter.

A more specific object of the present invention is to provide a fluid dynamic torque transmitting device having an impeller, a turbine driven by primary flow of fluid developed by the impeller, the primary flow returning from the turbine to the impeller across a plurality of reactionary, stationary, stator vanes which are operable to alter the direction of the primary flow of fluid prior to its return to the impeller, wherein a secondary flow of fluid is introduced through the stator vanes into the primary flow of fluid so as to change the direction of the primary flow prior to its reaching the impeller. By selectively varying the rate of flow of this secondary flow, the power absorption capacity of the torque converter is non-mechanically varied.

These and other more particular objects and advantages of the present invention are particularly set forth in or will become apparent from the following detailed description of a preferred form of the invention, when read in conjunction with the accompanying drawings.

DETAILED DECRIPTION OF THE PREFERRED EMBODIMENTS

Figure 1:
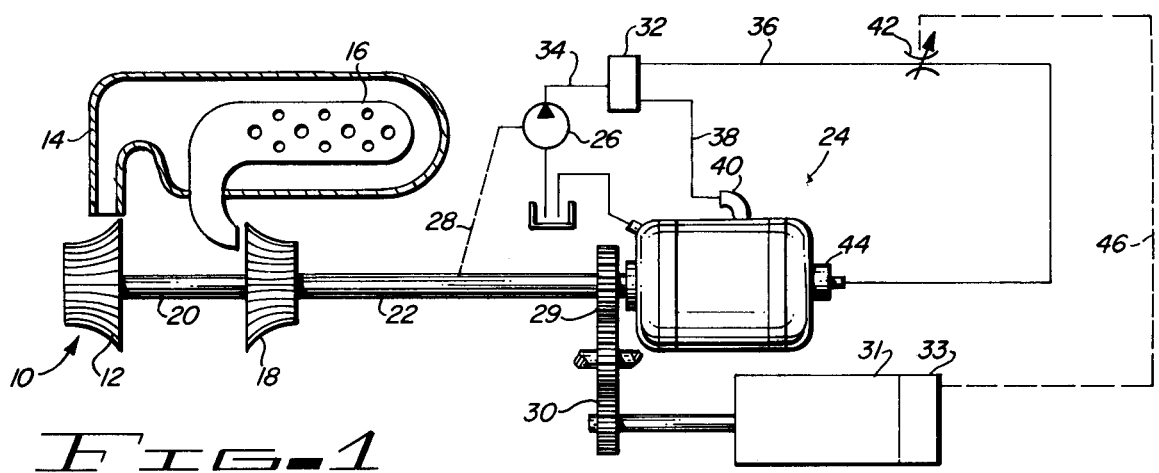
FIG. 1 is a schematic representation of a turbomachine having an improved torque converter as contemplated by the present invention operably coupled to the output shaft of the turbomachine.

Referring now more particularly to the drawings, there is schematically illustrated in FIG. 1 a fluid turbine machine or turbomachine generally designated by the numeral 10. The basic components of such a turbomachine are illustrated, including a centrifugal compressor 12 which delivers compressed air through ducting 14 into an external combustion chamber 16. A fuel delivery system and appropriate ignition means (not shown) also communicate with combustion chamber 16 so as to cause combustion and subsequent delivery of hot gases across a turbine 18 to drive the latter. A mechanical connection 20 extends between the turbine 18 and compressor 12 to drive the latter. A power output shaft 22 of turbomachine 10 provides rotary mechanical power output from the turbomachine. It will be apparent to those skilled in the art that the turbomachine 10 may take on varied forms and include a plurality of compressor and/or turbine stages 18, and that the power output shaft 22 may be independently rotatable of the driving connection 20.

Power output shaft 22 effectively operates as the input shaft to a torque converter generally designated by the numeral 24, and is also operably connected to drive a positive displacement hydraulic gear pump or source of pressurized fluid 26, as illustrated by the dash lines 28. Through a gear 29 on a power output shaft of the torque converter 24 that is coaxial with the input shaft 22, an external load 31 may be operably driven through an appropriate gear train 30. In the instance of utilization of turbomachine 10 as an auxiliary power unit in an aircraft, the external load 28 may represent the prime propulsion engine of the aircraft which is operable in varying ambient conditions. Such varying ambient conditions may be appropriately sensed through sensors 33.

The system illustrated in FIG. 1 further has a hydraulic flow divider 32 operably disposed in the output flow path 34 from pump 26 so as to appropriately divide flow therefrom between conduits 36 and 38. Conduit 38 carries a cooling and replenishing fluid flow into the torque converter through port 40, while fluid in conduit 36 passes across a variable flow control orifice means 42 into a secondary flow port 44. Variable orifice 42 may be of the manually adjustable type, or may be operably coupled to the sensors 33 as illustrated by dash lines 46 such that the position of orifice 42 and thus the rate of fluid flow through conduit 36 is automatically varied in relation to the ambient conditions.

Figure 2:
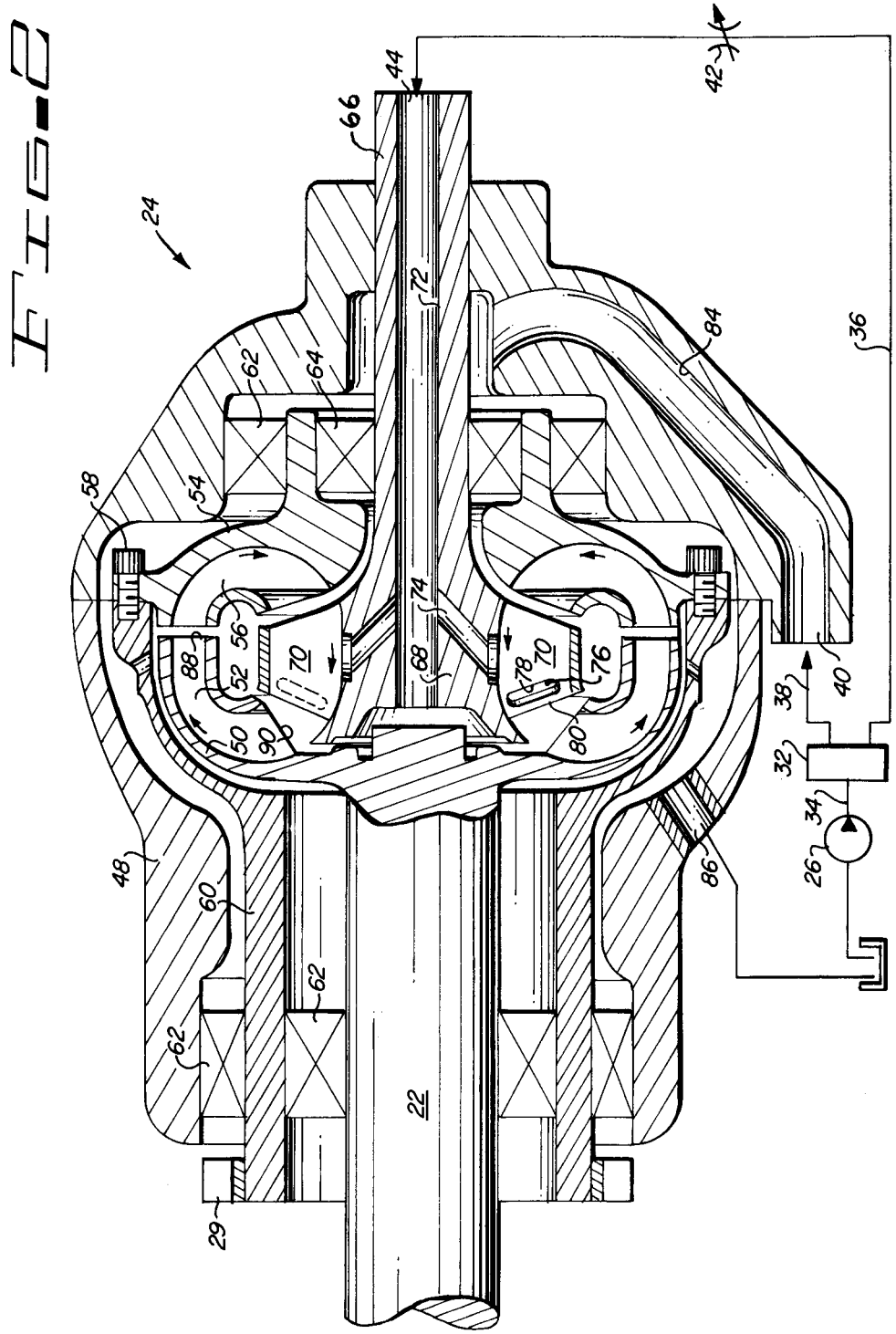
FIG. 2 is an axial cross-sectional view of a torque converter as contemplated by the present invention, and schematic representation of the hydraulic circuitry associated therewith.

Torque converter 24, as illustrated in greater detail in FIG. 2, is a fluid dynamic torque transfer device or fluid coupling having an outer, stationery casing 48 comprised of a pair of intersecured, hollowed sections. The torque converter includes a mechanically driven, centrifugal fluid impeller 50 securely mounted to or integrally formed with power input shaft 22. Impeller 50 includes a ring-like section for carrying motive fluid flow, and has a plurality of vanes 52 in this ring for directing the fluid flow.

A fluid driven turbine 54 is disposed in generally aligned and opposed relationship to impeller 50 with a similar ring-like section for receiving fluid flow developed by the impeller. Turbine 54 also has appropriated vanes 56 in its ring-like section upon which fluid delivered from the impeller impinges to dynamically transmit torque to rotate the turbine. Turbine 54 is securely attached as by bolts 58 to a power output shaft 60 of the torque converter to which the gear 29 is mounted. Appropriate bearings 62 rotatably mount the input shaft 22 and output shaft 60 to the stationary casing 48 so that the input and output shafts are rotatably carried thereon.

The turbine 54 and power output shaft 60 are also rotatably mounted by an appropriate bearing 64 to a stationary, elongated, hollowed tubular member 66 that is rigidly and non-rotatably secured to the casing 48 and extends therein to a sufficient distance such that the power output shaft 60 through its interconnection with turbine 54 is disposed in coaxial, surrounding relationship to at least a portion of tubular member 66. Mounted to the end of non-rotatable tubular member 66 is a stationary hub 68. A fluid reactor or stator means in the form of a plurality of reactionary, stationary stator vanes 70 are securely mounted to and periphally arranged around stationary hub 68. Stator vanes 70 are disposed between impeller 50 and turbine 54 such that fluid flow exhausted from the turbine passes across the stator vanes upon returning to the impeller. It will be apparent, therefore, that the disposition of the impeller, turbine and stator vanes presents a closed-loop toroidal primary flow path within casing 48 which carries a primary flow of fluid in closed-loop circulating fashion between the turbine and impeller.

Tubular member 66 has an elongated central bore 72 which communicates secondary flow port 44 with a plurality of radially extending ducts 74 in the hub 68 disposed centrally inside the toroidal primary flow path. Ducts 74 communicate with internal passages 76 within each of the hollowed stator vanes 70 as is clearly illustrated in FIGS. 3 and 5. Each of the stator vanes 70 has a substantially radially extending opening in the form of a slot 78 located at the trailing edge region 80 of the stator vane which is located adjacent impeller 50. Accordingly, the bore 72, duct 74, passages 76 and slots 78 present conduit means for introducing and delivering a secondary flow of fluid from pump 26 into the primary flow path at trailing edge 80 of the stator vanes. Preferably, the fluid in this secondary flow is the same as and of substantially the same density as the fluid utilized in the primary flow.

Figure 5:
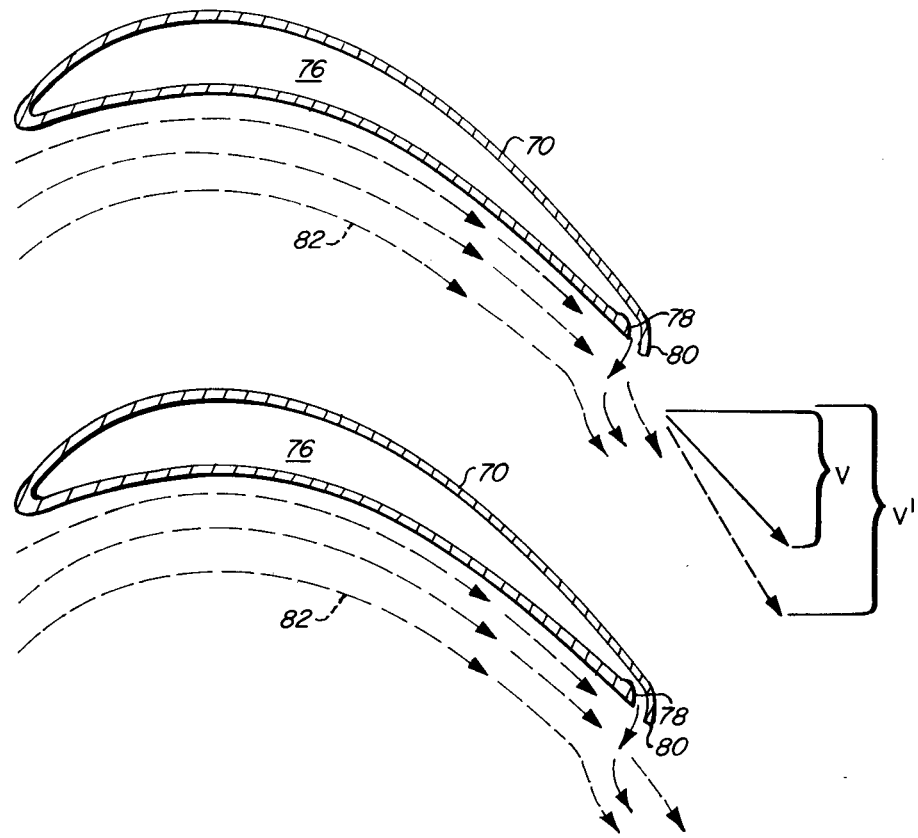
FIG. 5 is a cross-sectional plan view through a pair of adjacent stator vanes as taken along lines 5—5 of FIG. 3, with fluid flow schematically illustrated by arrows.

As clearly illustrated in FIG. 5, the disposition of slot 78 is such that the secondary fluid flow issuing therefrom is substantially normal in direction to the primary flow at this location. More particularly, the primary flow illustrated by dashed arrows 82 in the FIG. 5 has been redirected by stator vanes 70 such that upon leaving the trailing edge 80 and flowing to the adjacent impeller, the primary flow 82 has a tangential velocity component in a downward direction in FIG. 5 which is tangential to the direction of impeller rotation. This tangential velocity component is illustrated by the length of a vertically downwardly directed vector denoted by the length "V" in FIG. 5. Slots 78, being disposed on the "pressure" sides of stator vanes 70 upon which side the primary fluid flow 82 impinges, acts in a jet flap action to turn the primary fluid flow 82 downwardly as viewed in FIG. 5. Accordingly, the magnitude of the tangential velocity component increases from V to V'. Variable orifice 42 is operably to vary the rate of this secondary flow issuing from trailing edge 80 to thereby alter the tangential velocity component of the primary fluid flow in relation to the fluid flow restriction presented by orifice 42.

The cooling and replenishing fluid flow from conduit 38 and port 40 passes through a duct 84 in casing 48 to communicate with the interior thereof and ultimately communicate with the primary flow path at a location spaced from the trailing edge 80 of the stator vanes. More particularly, the replenishing fluid flow presents a third flow path that communicates with the interior of casing 48 near the center thereof and passes into the primary flow path wherever there may be openings thereinto. Excess fluid flow within the torque converter casing 48 exhausts therefrom through a return port 86 to return to a low pressure reservoir. It will be apparent to those skilled in the art that various other elements such as filters, heat exchangers, etc. may be incorporated into the hydraulic circuitry schematically illustrated in FIGS. 1 and 2. To assure that the interior casing 48 is maintained full of hydraulic fluid, for instance, there may be included a flow restricting device in the return port or passage to maintain back pressure within the casing.

To describe an exemplary operation of the present invention, it will be assumed that the turbomachine 10 is an auxiliary power unit of an aircraft which is operable to effect starting of a prime propulsion engine of the aircraft, which engine is represented by the external load 31. The auxiliary power unit 10 effects rotation of the input shaft and impeller 50 of torque converter 24 to produce the primary flow of fluid in the toroidal flow path. The primary flow impinges upon the turbine vanes 56 to transmit torque thereto and effect rotation of the output shaft 60. At low speed ratios, i.e., where the output shaft speed of rotation is substantially less than the rotational speed of the input shaft 22, maximum torque is transmitted to the output shaft to produce the required power for acceleration of the external load. It will be apparent that maximum torque is required at low speed ratios when the external load is being accelerated. As the speed ratio increases and output speed approaches input speed, the torque transmitted reduces substantially.

The load imposed upon turbomachine 10 is a function of the power absorption capacity of the fluid coupling 24 which imposes load directly upon the turbomachine. In turn, the power absorption capacity of the turbomachine is a function of the power required to effect rotation of impeller 50.

Turbomachine 10 must be operable in varying ambient conditions while acting to start the prime propulsion engine. In this connection, in addition to the capability of starting the prime propulsion engine while at sea level, it is desirable that the turbomachine be able to start the prime propulsion engine inflight, for instance at 25,000 feet altitude. The substantial variation in ambient conditions at sea level and 25,000 feet has a drastic effect on the power output capacity of the turbomachine. At 25,000 feet, for instance, the power output capacity of the turbomachine is substantially lower than at ground level. Accordingly, if the torque converter 24 is sized so as to be able to absorb the maximum power which may be produced by the turbomachine at ground level, then at high altitudes the torque converter 24 would be able to absorb a greater amount of power than can be produced by the turbomachine 10. As a result, the turbomachine would be overloaded and subject to stalling at the high altitude, less favorable ambient conditions.

The secondary fluid flow introduced through slot 78 into the primary flow path adjacent the trailing edge of the stator vanes allows the power absorption capacity of the torque converter 24 to be varied in relation to the power output capacity of the turbomachine 10 such that the maximum power that can be developed by the turbomachine at the prevailing ambient conditions can still be utilized in starting the prime propulsion engine, yet the turbomachine is never overloaded and stalling does not occur. To this end, the power utilized in rotating impeller 50 and thus the power absorption capacity of torque converter 24 is a function of the following term:

$$(U_o V_o - U_i V_i) M$$

where:

$U_o$ = tip velocity of impeller 50 at impeller exit edge 88

$V_o$ = tangential velocity component of the primary fluid flow at impeller exit edge 88, $U_i$ = tip velocity of impeller 50 at its inlet edge 90, $V_i$ = tangential velocity component of primary flow at the inlet edge 90 of the impeller (which is the same as the tangential velocity component at the trailing edge 80 of the stator vane illustrated by arrows V, V' in FIG. 5), and M = mass flow rate of the primary fluid flow through the impeller.

The foregoing relationship for the torque converter 24 assumes that the input speed of shaft 22 is constant, that the torque converter is of fixed size, and that the density of the hydraulic fluid in the primary flow path remains constant. As long as $V_i$ is in the same direction as the direction of rotation of the impeller ($U_i$), the term $U_iV_i$ remains positive, and therefore the horsepower absorbed and utilized by the impeller varies inversely with respect to changes in the tangential velocity $V_i$. Accordingly, as the secondary flow from slots 78 increases the tangential velocity component also increases, and the power absorption capacity of the torque converter decreases. Similarly, upon decrease of the secondary flow the torque converter power absorption capacity increases.

The introduction of the secondary flow through slots 78 also decreases mass flow rate, M, as the secondary flow increases in order to further reduce the power absorption capacity of the torque converter. While a certain amount of power is required to operate pump 26, and the power drawn from the turbomachine to operate pump 26 will increase as the secondary flow rate and pressure thereof increase, the hydrodynamic momentum exchange created by the secondary fluid flow upon the primary fluid flow has a substantially greater effect upon the power absorbed from the turbomachine than does the pump 26. Of course, if desired the pump 26 may be operated by a separate power source rather than the turbomachine 10.

For maximum performance, the torque converter is sized such that with substantially zero secondary flow issuing from slots 78, the torque converter will absorb the maximum power produced by the turbomachine at its most favorable prevailng ambient conditions where maximum absolute power may be generated by the turbomachine 10. For instance, the torque converter is sized so as to be able to absorb all of the power developed by the turbomachine at most favorable altitude, ambient pressure and ambient temperature conditions.

As the turbomachine is operated in less favorable prevailing ambient conditions, the secondary flow from slots 78 is accordingly increased by appropriate adjustment of variable orifice 42. Such increase in secondary flow reduces the power absorption capacity of the torque converter as described above, and in relation to the lower level of power being developed by the turbomachine. Accordingly, the turbomachine develops its maximum power under the prevailing ambient conditions, and the secondary flow rate is adjusted such that the power absorption capacity of the torque converter substantially matches the power output capacity of the turbomachine. The turbomachine thereby is allowed to develop its maximum power at the prevailing ambient conditions, which power is absorbed and utilized through the torque converter to drive the external load, yet the turbomachine is never subject to excessive loads which would otherwise cause stalling thereof. The adjustment of the secondary flow may be accomplished manually, or may be done automatically by use of the ambient condition sensors 33 connected to variable restrictor 42.

Figure 3:
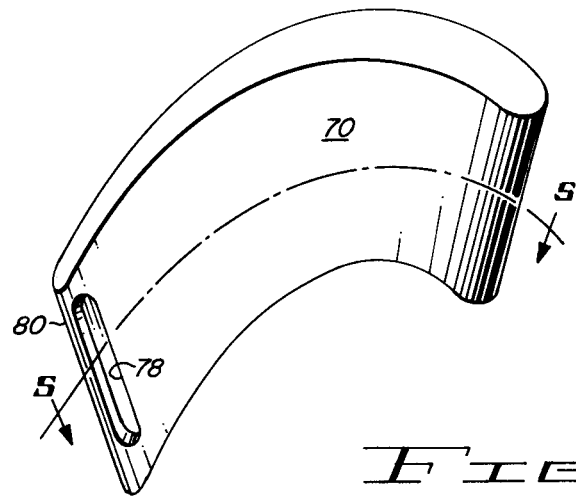
FIG. 3 is a perspective representation of one of the stator vanes of the device illustrated in FIG. 2.
Figure 4:
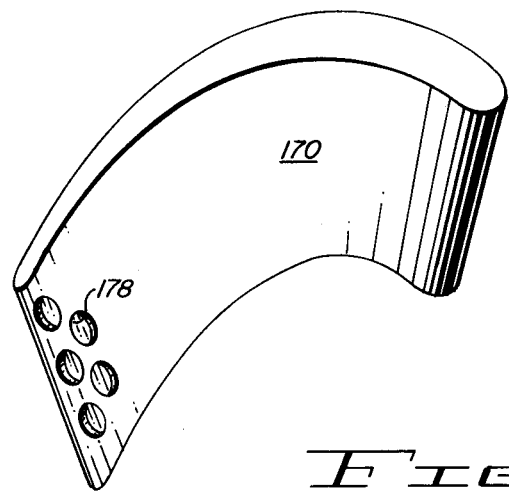
FIG. 4 is a perspective view similar to FIG. 3 but showing an alternate embodiment of stator vane.

FIG. 4 illustrates a modified form of stator vane 170 which utilizes a series of generally radially spaced drill holes 178 as openings instead of the single slot 78 of FIG. 3. The series of holes 178 may be of more economical construction in certain types of stationary vanes dependent upon the overall structure of the vane. For instance, the series of holes are more economical in manufacture when utilized in a stator vane that is formed of sheet metal and brazed to the stationary central hub.

Figure 6:
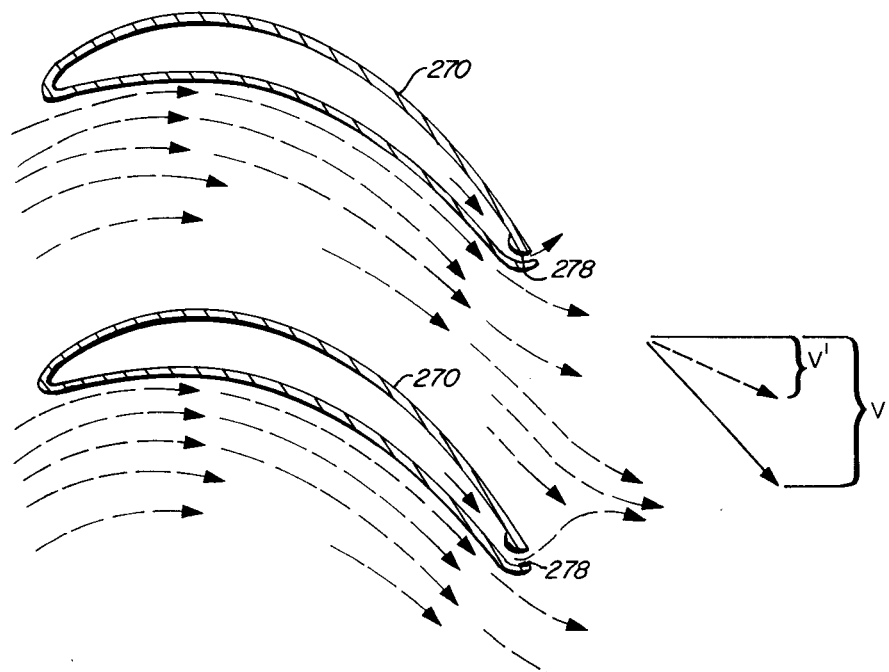
FIG. 6 is a view similar to FIG. 5 but showing an alternate position of the secondary flow.

FIG. 6 illustrates another modified form of stator vane 270 which incorporates a radial slot 278 at its trailing edge that opens on the "suction" side rather than "pressure" side of the stator vane. When so disposed, the effect of the secondary flow issuing from the slot 278 is to reduce, rather than increase, the magnitude of the tangential velocity component of the primary fluid in a direction tangential to the direction of the impeller flow, as illustrated by the change in the magnitude of the downward vertical tangential velocity component vector V to V'. with such arrangement, it will be apparent that the effect of secondary flow issuing from slots 278 is to decrease the impeller inlet tangential velocity and thereby increase the power absorption capacity of the torque converter. For such arrangement, the torque converter is sized such that with maximum secondary flow issuing from slots 278, the torque converter will absorb the maximum power developed by the turbomachine at the most favorable ambient conditions. As less favorable ambient conditions are encountered and the power of the turbomachine decreases, the secondary flow rate is accordingly decreased to reduce the power absorption capacity of the torque converter in corresponding relationship. It has been found that the positioning of the secondary flow slot in the stator vanes as illustrated in FIG. 5 is preferable to that shown in FIG. 6 because the arrangement shown in FIG. 6 tends to reduce the efficiency of operation of the torque converter in transmitting power between its input shaft and output shaft. In comparison, the arrangement shown in FIG. 5 tends to increase the efficiency of torque converter operation. Either embodiment, however, is operable to non-mechanically vary the power absorption capacity of the torque converter without introduction of mechanical complexity into the torque converter.

Various other modifications of the structure illustrated will also be apparent to those skilled in the art. For instance, the row of stator vanes disposed between the turbine and impeller adjacent the stationery hub 68 may alternately be located between the impeller and turbine such that the primary fluid flow passes across the stators when flowing from the impeller to the turbine, or at yet other different locations within the toroidal primary flow path. As is also known within the art, there may be a plurality of stator sections in the primary flow path. Further, the present arrangement for hydraulically varying the power absorption capacity of the torque converter may be utilized in conjunction with, rather than instead of, mechanically variable torque converter power absorption capacity arrangements such as those previously described.

From the foregoing it will be apparent that the present invention contemplates an improved method of varying the power absorption capacity of a fluid dynamic torque transmitting device or torque converter fluid coupling having a mechanically driven fluid impeller and a hydraulically driven turbine, which includes the steps of driving the impeller to produce a primary flow of fluid therefrom to the turbine to drive the latter; returning the primary fluid flow from the turbine to the impeller in closed-loop fashion; introducing a secondary flow of fluid into the primary fluid flow to alter the direction of the latter; and varying the rate of the secondary fluid flow to thereby vary the power absorption capacity of the torque converter. More particularly, the secondary flow of fluid is introduced into the primary flow path through openings at the trailing edges of stationary stator vanes disposed in the primary flow path. Further, the invention contemplates use of such a hydraulically variable power absorption capacity torque converter as the device which loads a fluid turbomachine that is subject to stalling. The power absorption capacity of the torque converter is varied in relation to the prevailing ambient conditions such that this power absorption capacity substantially matches the power output capacity of the fluid turbomachine such that the load imposed upon the turbomachine never exceeds the power output capacity thereof at the particular prevailing ambient conditions. This method thereby avoids stalling of the turbomachine while allowing the maximum power developed by the turbomachine at the prevailing ambient conditions always to be absorbed by the torque converter.

While a preferred arrangement of the present invention has been specifically set forth in detail in the foregoing specification, it will be apparent that various modifications and alterations thereof may be utilized without departing from the scope and spirit of the invention as set forth in the appended claims.

Having described the invention with sufficient clarity that those skilled in the art may make and use it, I claim:

1. A method of varying the power absorption capacity of a torque converter having an impeller and a turbine, comprising the steps of:
   driving the impeller to induce a primary flow of fluid therefrom to said turbine to drive the latter;
   returning said primary fluid flow from said turbine to the impeller;
   introducing a secondary flow of fluid into said primary fluid flow to alter the direction of the latter; and
   varying the rate of said secondary fluid flow to vary the power absorption capacity of the converter.

2. A method of varying the power absorption capacity of a fluid coupling having a mechanically-driven fluid impeller, a fluid driven turbine, and stator means between the impeller and turbine; comprising the steps of:
   driving the impeller to produce a primary flow of fluid from the impeller to the turbine to drive the latter;
   returning the primary flow of fluid from the turbine across said stator means to the impeller; and
   selectively altering the direction of the returning primary flow of fluid prior to reaching the impeller by selectively varying the rate of flow of a secondary flow of fluid introduced into the primary flow of fluid.

3. A method of operating a fluid turbomachine in varying ambient conditions which alter the power output capacity of the turbomachine, said turbomachine being subject to stalling whenever the load imposed thereon exceeds the power output capacity of the turbomachine, said method comprising:
   providing a fluid coupling at the output shaft of said turbomachine to impose loads on the turbomachine in relation to the power absorption capacity of the fluid coupling, said coupling including an impeller driven by said turbomachine, and a fluid driven turbine;
   operating said turbomachine to rotate the impeller and produce a primary flow of fluid therefrom to said turbine to drive the latter;
   returning the primary flow of fluid from the turbine to said impeller;
   selectively introducing a secondary flow of fluid into the primary flow of fluid to alter the direction of the latter; and
   selectively varying the rate of flow of said secondary flow of fluid in relation to prevailing ambient conditions to vary the power absorption capacity of the fluid coupling, whereby the load imposed upon said turbomachine does not exceed said power output capacity of the turbomachine at said prevailing conditions to thereby avoid stalling of said turbomachine.

4. A fluid coupling comprising:
   an impeller for producing a primary flow of fluid;
   a turbine operably driven by said primary flow of fluid and arranged relative to said impeller whereby said primary flow of fluid returns from said turbine back to said impeller;
   means for introducing a secondary flow of fluid into said primary flow of fluid to change the direction of the latter; and
   means for selectively varying the rate of flow of said secondary flow of fluid to vary the power absorption capacity of said fluid coupling.

5. In combination with a fluid turbomachine having a power output shaft and a power output capacity which varies in relation to prevailing ambient conditions, said turbomachine being subject to stalling whenever the load imposed upon said power output shaft exceeds the power output capacity of said turbomachine; a fluid dynamic torque transfer device operably coupled to said output shaft of the turbomachine for imposing loads thereon in relation to the power absorption capacity of said device, said device comprising:
   a casing having a closed loop flow path for carrying a primary flow of fluid;
   an impeller disposed in said flow path and rotatable to produce said primary flow, said impeller being operably coupled to said output shaft of the turbomachine to be rotated by the latter;
   a rotatable turbine disposed in said flow path whereby said primary flow dynamically transmits torque to rotate said turbine;
   stator means disposed in said flow path between said impeller and said turbine for changing the direction of said primary flow;
   means for introducing a secondary flow of fluid into said flow path through said stator means for varying said direction of primary flow and said power absorption capacity of the device in relation to the rate of said secondary flow; and
   means for varying said rate of secondary flow in relation to prevailing ambient conditions to allow said turbomachine to transmit its maximum power output to said device at different prevailing ambient conditions while avoiding stalling of said turbomachine during operation at said different ambient conditions.

6. A fluid dyanmic torque transmitting device comprising:
   a casing defining a closed loop flow path therein for carrying a primary flow of fluid;
   power input and output shafts rotatably carried by said casing;
   an impeller operably coupled to said input shaft and disposed in said flow path to produce said primary flow upon rotation of the input shaft;
   a turbine disposed in said flow path and operably coupled to said output shaft whereby said primary flow dynamically transmits torque to rotate said turbine and said output shaft;

a plurality of reactionary, stationary, stator vanes disposed in said flow path between said impeller and turbine whereby said primary flow passes across said vanes upon returning from said turbine to said impeller, each of said vanes having passages therewithin and openings allowing fluid communication between said passages and said flow path;

means operably communicating with said passages for delivering a secondary flow of fluid through said openings into said flow path to change the direction of said primary flow therein; and means for varying the rate of said secondary flow of fluid delivered through said passages into said flow path.

7. A device as set forth in claim 6, wherein said primary flow has a tangential velocity component extending tangentially to the direction of rotation of said impeller, said openings in the stator vanes being arranged whereby said secondary flow of fluid therethrough changes the magnitude of said tangential velocity component.

8. A device as set forth in claim 7, wherein said input shaft is adapted to be rotated at a substantially constant speed.

9. A device as set forth in claim 7, wherein said openings are arranged whereby increase in said rate of secondary flow increases said magnitude of the tangential velocity component.

10. A device as set forth in claim 7, wherein said openings are arranged whereby increase in said rate of secondary flow decreases said magnitude of the tangential velocity component.

11. A device as set forth in claim 7, wherein said openings in said stator vanes are disposed adjacent trailing edges of said vanes located adjacent said impeller, said openings arranged whereby said secondary flow of fluid enters said flow path in a direction substantially normal to the direction of said primary flow at said trailing edges of the vanes.

12. A device as set forth in claim 11, wherein said opening in each of said vanes comprises a series of holes arranged substantially radially along said vane adjacent said trailing edge.

13. A device as set forth in claim 11, wherein said opening in each of said vanes comprises a slot extending substantially radially along said vane adjacent said trailing edge.

14. A device as set forth in claim 13, wherein said means for delivering a secondary flow of fluid to said passages includes a source of pressurized fluid of substantially the same density as said fluid in the primary flow, and conduit means communicating with said source and extending inside said casing to communicate with said passages in the stator vanes.

15. A device as set forth in claim 14, wherein said source is operably coupled to said input shaft whereby said source is driven by said input shaft.

16. A device as set forth in claim 15, wherein said impeller and said turbine cooperate with said casing and said stator vanes to define said flow path as a closed loop toroidal path for carrying said primary flow.

17. A device as set forth in claim 16, further including a hub located radially inside said toroidal path, said stator vanes being rigidly secured to said hub, said conduit means extending through said hub to communicate with said passages.

18. A device as set forth in claim 17, further including an elongated, hollowed member extending axially into said casing in secured relationship with said hub and defining a portion of said conduit means, said output shaft being disposed in coaxial, surrounding relationship to at least a portion of said elongated member.

19. A device as set forth in claim 18, futher including means defining a third path of fluid flow into said casing to communicate with said toroidal path at a location spaced from said slots in the stator vanes, for delivering a cooling and replenishing flow of fluid to said toroidal path.

20. A fluid dynamic torque transmitting device comprising:

a casing defining a closed loop flow path therein for carrying a primary flow of fluid;

power input and output shafts rotatably carried by said casing;

an impeller operably coupled to said input shaft and disposed in said flow path to produce said primary flow upon rotation of the input shaft;

a turbine diposed in said flow path and operably coupled to said output shaft whereby said primary flow dynamically transmits torque to rotate said trubine and said output shaft;

a plurality of reactionary, stationary, stator vanes disposed in said flow path between said impeller and turbine whereby said primary flow passes across said vanes upon returning from said turbine to said impeller and has a tangential velocity component extending tangentially to the direction of rotation of said impeller, each of said vanes having an internal passage, a radially extending trailing edge located adjacent said impeller, and an opening extending substantially radially along said trailing edge to allow fluid communication between said internal passage and said flow path;

means operably communicating with said internal passages for delivering a secondary flow of fluid through said openings into said flow path in a direction substantially normal to the direction of said primary flow to alter the magnitude of said tangential velocity component of the primary flow in relation to the rate of said secondary flow; and means for varying said rate of secondary flow whereby increase and decrease of said secondary flow respectively increases and decreases said magnitude of the tangential velocity component to thereby respectively decrease and increase the power absorption capacity of said device.

* * * * *